Oct. 28, 1969          P. M. LLEWELLYN                    3,475,605
          ION CYCLOTRON DOUBLE RESONANCE SPECTROMETER EMPLOYING
                  A SERIES CONNECTION OF THE IRRADIATING
                  AND OBSERVING RF SOURCES TO THE CELL
Filed May 2, 1967                                      2 Sheets-Sheet 1

INVENTOR.
PETER M. LLEWELLYN
BY
ATTORNEY

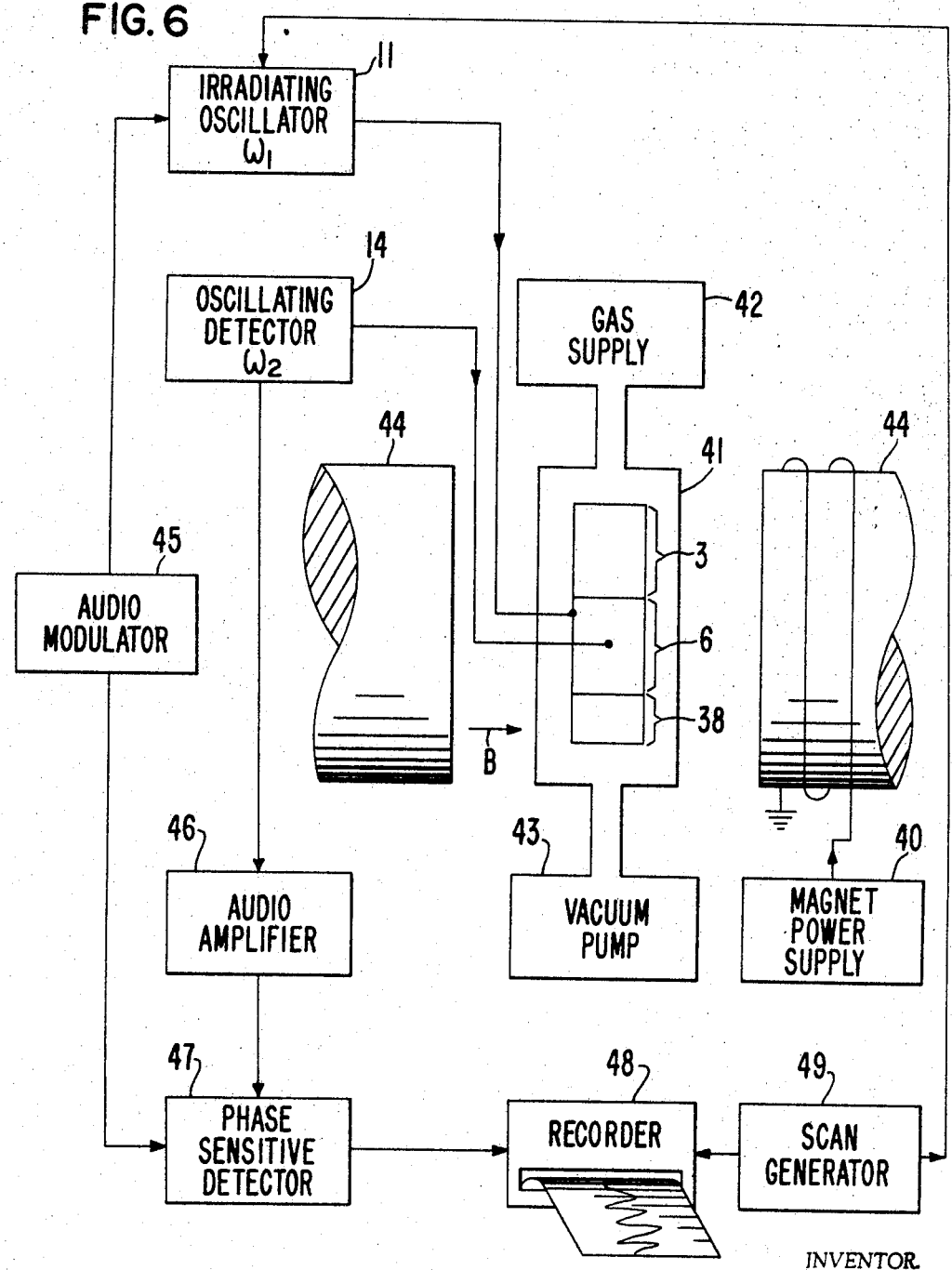

United States Patent Office 3,475,605
Patented Oct. 28, 1969

3,475,605
ION CYCLOTRON DOUBLE RESONANCE SPECTROMETER EMPLOYING A SERIES CONNECTION OF THE IRRADIATING AND OBSERVING RF SOURCES TO THE CELL
Peter M. Llewellyn, Menlo Park, Calif., assignor to Varian Associates, Palo Alto, Calif., a corporation of California
Filed May 2, 1967, Ser. No. 635,514
Int. Cl. H01j *39/34*
U.S. Cl. 250—41.9      7 Claims

ABSTRACT OF THE DISCLOSURE

An ion cyclotron double resonance spectrometer is disclosed in which the observing limited oscillator also known as a marginal oscillator or oscillating detector, and the irradiating transmitter are connected in series to the resonance or analyzing cell to reduce coupling of irradiating power into the limited oscillator. The spectrometer includes an electrode structure contained in an evacuated envelope and immersed in a magnetic field as of 3000 gauss. The electrode structure comprises a hollow elongated rectangular electrode array. An ion source region is disposed at one end of the electrode structure for ionizing gas and projecting a beam of ions axially of the electrode structure. An ion collector electrode is at the other end of the electrode structure for collecting the ion beam or portions thereof. An analyzer structure is disposed along the beam path between the ion source and ion collector for exciting and detecting cyclotron resonance of ions within the beam. In the analyzer region of the spectrometer, the ion beam is irradiated with a relatively strong radio frequency electric field at a first frequency obtained from a radio frequency transmitter to produce cyclotron resonance a first species of ions. Also in the same analyzing region and by means of common electrode structure a second RF electric field which is relatively weak is applied at a second frequency from a limited oscillator to excite and detect cyclotron resonance of a second species of ions. The irradiating transmitter and limited oscillator are connected in series with each other across the common analyzing electrode structure, whereby the relatively large transmitter RF potential is largely dropped across the high impedance electrode structure and relatively decoupled from the input of the limited oscillator.

DESCRIPTION OF THE PRIOR ART

Heretofore, ion cyclotron double resonance spectrometers have been built. Such a prior art spectrometer is described and claimed in the copending U.S. patent application Ser. 566,973 filed July 21, 1966 and assigned to the same assignee as the present invention. In this prior spectrometer, the source of radio frequency irradiating potential at a first frequency was connected in parallel with the oscillating detector across the common electrode of the ion resonance (analyzer) structure. Thus, the relatively large irradiating RF potential was heavily coupled into the tank circuit of the oscillating detector. This heavily overloaded the oscillating detector at harmonics and subharmonic frequencies of the oscillating detector. This overloading manifested itself as a series of beat signals which could mask detection of cyclotron resonance signals it was desired to observe.

SUMMARY OF THE PRESENT INVENTION

The principal object of the present invention is the provision of an improved ion cyclotron double resonance spectrometer.

One feature of the persent invention is the provision, in an ion cyclotron double resonance spectrometer, of connecting the irradiating transmitter and the observing oscillating detector in series with the common analyzer electrodes, whereby the relatively large irradiating RF potential is substantially decoupled from the oscillating detector.

Another feature of the present invention is the same as the preceding feature wherein a resistor is provided in series between the tank circuit of the oscillating detector and the electrode of the analyzing structure and the transmitter is connected in parallel with and across the resistor.

Another feature of the present invention is the same as the immediately preceding feature wherein the resistor is connected between one plate of the analyzing electrode structure and ground and the analyzing electrode structure is separated from the ion source electrode structure.

Other features and advantages of the present invention will become apparent upon a perusal of the following specification taken in connection with the accompanying drawings wherein:

BRIEF DESCRIPTION OF THE DRAWING

FIG. 6 is a schematic block diagram of a double resonace spectrometer of the present invention.

DESCRIPTION OF THE PREFERRED EMBODIMENTS

Figure 1:
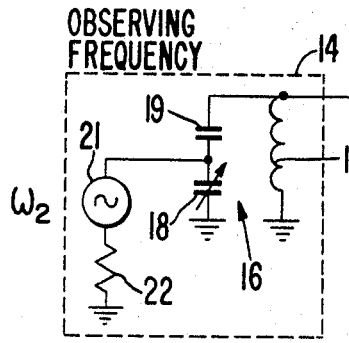
FIG. 1 is a schematic simplified circuit diagram for the analyzer region of the prior art double resonance spectrometer.
Figure 1:
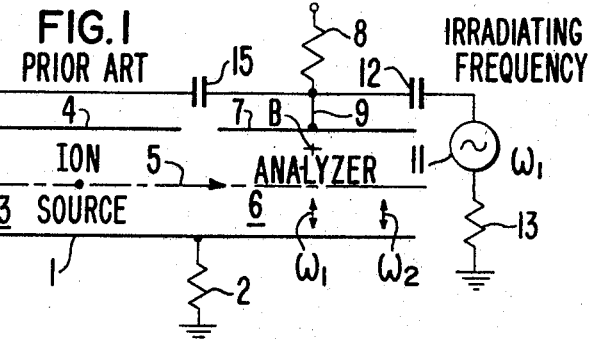

Referring now to FIG. 1, there is shown the prior art double resonance electrode structure with its circuits for exciting the analyzer section. The electrode structure is more fully described below with regard to FIG. 5. Briefly, the structure includes an elongated rectangular base plate 1 which is grouned through a low resistance 2. An ion source region 3 includes a top rectangular electrode 4 which is D.C. biased at about 1ν positive with respect to the base plate 1. A beam of electrons is passed through apertured side plates, not shown, to ionize gas within the source 3. Ions produced are projected along a beam path 5 and into an analyzer electrode structure 6.

The analyzer 6 includes the base electrode 1 and a top rectangular plate 7. The top plate is D.C. biased at a small positive potential, as of 1ν, relative to the grounded base plate 1 via isolating resistor 8 and lead 9.

In the analyzer 6 (resonance cell), two radio frequency electric fields at first and second frequencies $\omega_1$ and $\omega_2$, respectively, are applied at right angles to a undirectional magnetic field B. The first radio frequency potential $\omega_1$ is applied across the plates 1 and 7 from a transmitter 11 via D.C. blocking capacitor 12, resistor 2, and its internal resistance 13 to ground. The second radio frequency potential $\omega_2$ is applied across the plates 1 and 7 from an oscillating detector 14 (also known as a marginal or limited oscillator) via D.C. blocking capacitor 15 and resistor 2 through ground.

The oscillating detector 14 includes a parallel resonant circuit 16 comprising a parallel connection of an inductor 17 and two series connected capacitors 18 and 19. Capacitor 18 serves as a tuning capacitor for the tank 16 and also serves as an impedance matching transformer with capacitor 19 to match the oscilllator 21 with its internal resistance 22 to tank 14.

Figure 2:
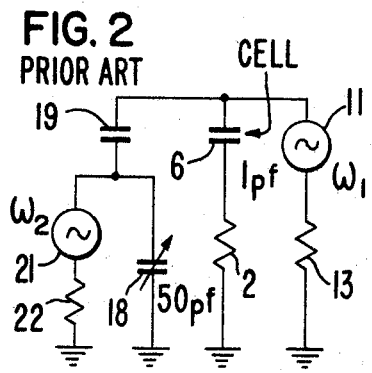
FIG. 2 is a simplified equivalent circuit for the prior art circuit of FIG. 3.

The equivalent circuit for the structure of FIG. 1 is shown in FIG. 2. The transmitter 11, typically, is operated at a higher frequency and power level than the oscillating detector 14 for applying its RF potential at $\omega_1$ across the pair of analyzer electrodes 1 and 7 which have a capacitance of about 1 pf. The oscillator 21 of the oscillating detector 14 is connected across tuning and matching capacitor 18 which has a capacitance of about 50 pf. As can be seen from the equivalent circuit of FIG. 2, the input of the oscillating detector 14 is connected in parallel with the irradiating transmitter 11 across the analyzer cell 6.

The problem with this prior art arrangement is that the relatively strong RF signal produced by irradiating transmitter 11 and as developed across the analyzer cell 6 is heavily coupled directly into the input circuit of the oscillating detector 14. As a result, when the irradiating transmitter frequency $\omega_1$ is at some harmonic or subharmonic of the oscillating detector frequency $\omega_2$, the oscillating detector will deliver a beat frequency of a large amplitude to the audio amplifier 46 of the complete spectrometer (see FIG. 6).

These beat oscillations mask detection of cyclotron resonance within the analyzer cell 6 when operating within these harmonically related frequency bands.

Figure 3:
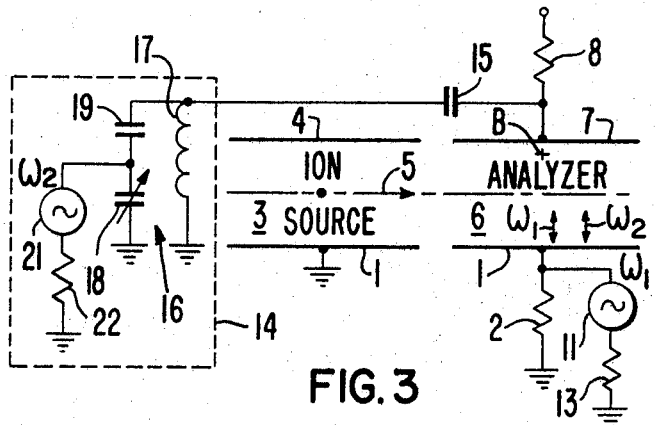
FIG. 3 is a schematic circuit diagram, similar to that of FIG. 1, as modified according to the present invention.

Referring now to FIG. 3, there is shown the electrode structure and related circuitry of the present invention. The apparatus of FIG. 3 is essentially identical to the prior art of FIG. 1 except that the base plate electrode 1 has been separated in the analyzer cell 6 from that portion of the base electrode 1 in the ion source 3. In addition, the irradiating transmitter 11 is connected across resistor 2.

Figure 4:
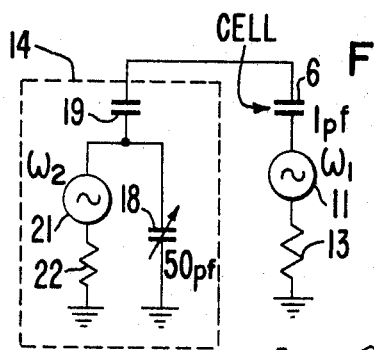
FIG. 4 is a simplified equivalent circuit for the circuit of FIG. 3.

The equivalent circuit for the apparatus of FIG. 3 is shown in FIG. 4. From the equivalent circuit, it is seen that the irradiating transmitter 11 is connected in series with the high impedance cell 6 and the oscillating detector 14. The input for the oscillator 21 is derived across the tuning capacitor 18, as of 50 pf. Thus, the intensity of the irradiating transmitter signal, which is coupled into the oscillating detector 21, is down by at least a factor of 50 as compared with the intensity of the irradiating RF voltage developed across the analyzer cell 6. This amount of attenuation of the coupling of the irradiating transmitter signal into the oscillating detector has been found to be sufficient to substantially avoid the harmonically and subharmonically related beat oscillations of the oscillating detector 21. Separating the base plate electrode 1 in the analyzer cell 6, prevents the irradiating field from being coupled into the ion source region 3.

Figure 5:
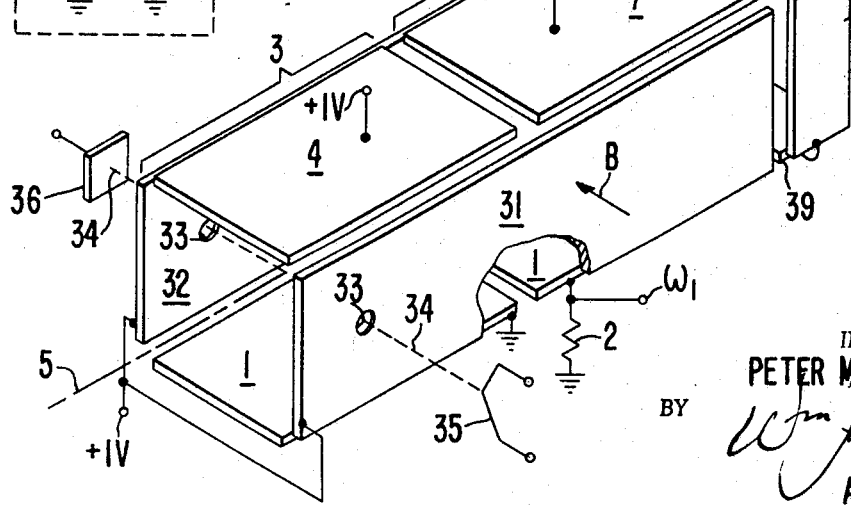
FIG. 5 is a schematic perspective view of the ion cyclotron resonance electrode structure of the present invention.

Referring now to FIG. 5, there is shown the electrode structure of the present invention. The electrodes are as previously described except that a pair of elongated rectangular side plate electrodes 31 and 32 are disposed on opposite sides of the structure. The side plates 31 and 32 are apertured at 33 in the ion source region 3 to permit a beam of electrons 34 to pass therethrough from a filamentary emitter 35 to an electron collector electrode 36. The beam 34 serves to ionize gas within the ion source region and to provide the ions for the ion beam 5. A static electric potential, as of 1$\nu$, positive with respect to the grounded base plate 1 is applied to both side electrodes 31 and 32 to keep the ion beam 5 equidistant from both plates 31 and 32 and, thus, on the center line of the electrode structure. An ion collector structure 38 is provided at the other end of the beam path 5 for collecting the ions. The collector structure 38 comprises four side electrode plates 39 which are all grounded to form an electric field free region in which the ions will drift under the influence of the magnetic field B to the side plates 39' and be collected.

Referring now to FIG. 6, there is shown an ion cyclotron double resonance spectrometer employing features of the present invention. It is assumed, for the sake of explanation, that it is desired to detect the following ion-molecule reaction:

$$C_2H_4^+ + C_2H_4 \rightarrow C_3H_5^+ + CH_3$$

$C_2H_4$ gas is leaked into an evacuated envelope 41 from a gas supply 42. The envelope 41 is evacuated to a desired pressure within the range of $10^{-4}$ torr to $10^{-2}$ torr via an 8 liter/sec getter-ion pump 43. The electrode structure of FIG. 5 is disposed in the envelope 41 and the envelope is immersed in an intense unidirectional magnetic field, as of 3.8K6, produced by an electromagnet 44 and power supply 40.

In the ion source 3, the $C_2H_4$ gas is ionized to form $C_2H_4^+$ which is projected in the ion beam 5 into the analyzer cell 6. In the analyzer cell 6, the ions react with the $C_2H_4$ molecules to produce the products $C_3H_5^+$ and $CH_3 \cdot C_2H_4^+$ has a cyclotron resonance frequency in the 3.8K6 magnetic field of 205 kHz. and the cyclotron resonance frequency for the $C_3H_5^+$ product in the same field B is 14 kHz.

The irradiating oscillator 11 is tuned to 205 kHz. to excite resonance of the $C_2H_4^+$ ions and to stimulate the aforecited reaction. The irradiating oscillator 11 is modulated by square wave modulator 45 at a convenient audio frequency as of 40 Hz. to modulate the stimulating effect, if any, on the reaction. The oscillating detector 14 is tuned to 140 kHz. to excite and detect cyclotron resonance of the $C_3H_5^+$ ion product.

The output of the oscillating detector 14 is fed to an audio frequency amplifier 46 and thence to one input of a phase sensitive detector 47 wherein it is compared with a sample of the audio modulation signal. The output of the phase sensitive detector 47 is a D.C. resonance signal indicating that the observed ions at $\omega_2$ originated from a reaction with $C_2H_4^+$ ions since the audio modulation can only be transmitted via the ion-molecule reaction from the $C_2H_4^+$ ion to the $C_3H_5^+$ ion.

The D.C. output of the phase sensitive detector 47 is fed to a recorder 48 and recorded as a function of a scan of the irradiating frequency $\omega_1$ to produce the output spectrogram. The irradiating frequency $\omega_1$ is scanned by a scan signal derived from a scan generator 49. A sample of the scan signal is fed to the recorder 48.

The electrode apparatus has been described as employed for analyzing positive ions. Negative ions may be analyzed by reversing the sign of the trapping voltage applied to the side plates 31 and 32 with additional sign changes in the voltages applied to plates 4 and 8 and a reversal of the magnetic field direction.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an ion cyclotron double resonance spectrometer, means forming a source of ions, means forming a pair of electrodes straddling an ensemble of the ions produced by said source, means for producing a magnetic field in the region between said pair of electrodes, means for applying a first radio frequency potential at a first frequency across said pair of electrodes to excite cyclotron resonance of ions of a first species, means for applying a second radio frequency potential at a second frequency across said pair of electrodes to excite and detect cyclotron resonance of ions of a second species, the improvement wherein, said means for applying the first radio frequency potential and said means for applying the second radio frequency potential are connected in series with each other and with said pair of electrodes.

2. The apparatus of claim 1 wherein said means for applying the second radio frequency potential to said pair of electrodes is an oscillating detector.

3. The apparatus of claim 2 wherein said oscillating detector includes a tuned tank circuit, and said tank circuit is connected in series with said means for applying the first radio frequency potential and series connected with said pair of electrodes.

4. The apparatus of claim 1 wherein said means for applying the first radio frequency potential to said pair of electrodes includes a resistor, said resistor being connected in series with said means for applying the second radio frequency potential and in series with said pair of electrodes, and a radio frequency transmitter at the first frequency being connected in parallel with said resistor.

5. The apparatus of claim 4 wherein said resistor is connected from one of said pair of electrodes to ground.

6. The apparatus of claim 3 wherein said tank circuit comprises a parallel connection of capacitive means with inductive means and wherein the capacitance of said capacitive means is at least ten times the capacitance of said pair of electrodes.

7. The apparatus of claim 1 wherein said ion source and said pair of analyzing electrodes each include a D.C. grounded electrode and wherein said ion source grounded electrode is grounded through a circuit separate from the grounding circuit which D.C. grounds said grounded analyzing electrode.

References Cited

UNITED STATES PATENTS 2,939,952   6/1960   Paul et al. _____ 250—41.92

RALPH G. NILSON, Primary Examiner

C. E. CHURCH, Assistant Examiner